United States Patent [19]

Bacso

[11] Patent Number: 5,591,940
[45] Date of Patent: Jan. 7, 1997

[54] PROTECTIVE SLEEVE

[75] Inventor: Douglas E. Bacso, Cleveland, Ohio

[73] Assignee: General Electric Company, Schenectady, N.Y.

[21] Appl. No.: 299,314

[22] Filed: Aug. 22, 1994

[51] Int. Cl.⁶ .............................. F16L 57/00; F16L 21/00
[52] U.S. Cl. .......................... 174/101; 138/109; 138/147; 138/110; 285/419
[58] Field of Search .................................... 174/101, 136; 138/109, 110, 113, 147, 148, 156, 157, 158; 285/45, 325, 326, 373, 419

[56] References Cited

U.S. PATENT DOCUMENTS

| 2,736,451 | 2/1956 | Fogg ................................. 138/157 X |
| 4,942,907 | 7/1990 | Joh et al. ............................ 138/157 |

FOREIGN PATENT DOCUMENTS 1357412  6/1974  United Kingdom ................... 285/325

Primary Examiner—Hyung S. Sough
Attorney, Agent, or Firm—Nixon & Vanderhye

[57] ABSTRACT

A protective sleeve includes a sleeve body and a cover, each having a generally semi-cylindrical cross-section. The cover includes a groove along its longitudinal edges for receiving a silicone chord sealing gasket. The sleeve body has a short cylindrical externally threaded section at one end for threaded connection within the recess of a connector ring. One end of the cover is disposed in the recess and the opposite end engages a stop carried by the sleeve body. The cover and sleeve body are latched with over-center latches to one another whereby an effective seal is formed between the cover and sleeve body. By opening or closing the latches and manipulating the cover relative to the sleeve body, the cover can be replaced rapidly should the sealing gasket become damaged.

8 Claims, 4 Drawing Sheets

PROTECTIVE SLEEVE

TECHNICAL FIELD

The present invention relates to a sleeve construction for protecting cabling and portions of an instrument, and particularly relates to a protective sleeve mounted externally of a vessel for protecting electrical cabling from and a portion of an instrument disposed within the vessel.

BACKGROUND

Remote monitoring of various parameters sensed by instruments within a closed vessel is a common technique. For example, in a nuclear reactor, it is desirable to monitor various parameters, including the reactivity inside the closed reactor vessel. Thus, neutron measuring instruments (and others) are typically disposed within the vessel at various locations and at least portions of the instruments including electrical cabling conventionally extend through ports formed in the bottom of the vessel whereby the signals from the instruments can Be connected to monitors external to the vessel.

Conventionally, the cabling and portions of the instruments hang below the vessel and into a confined and congested work area. Maintenance is typically performed in that area and during scheduled maintenance outages, heavy equipment is also used in this area. Consequently, there is a potential for damaging the cabling and/or portions of the instruments exposed below the vessel. For that reason, protective sleeves have previously been used to protect the cabling and instrument portions depending from the vessel. Such protector sleeves have also been designed to prevent water intrusion into the sleeve that could compromise the electrical integrity of the instrument.

In a previous protective sleeve employed for this purpose, a cylindrical sleeve was provided through which the instrument portion would extend, as well as the electrical cable. A portion of the sleeve, i.e., about 60% was formed of a semi-cylindrical body and semi-cylindrical cover, each having four lugs projecting laterally from each of the body and cover which, when in registry with one another, receive screws whereby the cover and sleeve body may be secured to one another. One end of the cover was received in an annular ring about the protective sleeve. Also, a rectangular gasket was incorporated into the body of the sleeve which, when the cover was secured by the screws to the sleeve body, formed a seal between the cover and body. However, over time, the rectangular sealing gasket was easily damaged and became unbonded relative to the sleeve body. Watertight integrity was lost and essentially the replacement of the gasket required the replacement of the entire sleeve. Importantly, however, the annual maintenance removal and reinstallation of an old protective sleeve cover was not only labor-intensive with that type of construction but also necessarily performed in an area which may be subject to small radiation doses. Typically, the installation of a new protective sleeve cover of this type required an average time of about ten minutes. Because of the potential of radiation exposure, however small and within safe limits, a reduction in the installation time is highly beneficial to minimize any such exposure.

DISCLOSURE OF THE INVENTION

In accordance with the present invention, there is provided a novel and improved protective sleeve for protecting electric cabling and portions of instruments which project from closed vessels and which minimizes or eliminates the foregoing described and other problems associated with prior protective sleeves of this type. Particularly, the present invention provides a protective sleeve which provides an effective watertight seal and simultaneously minimizes the time required for sleeve installation. To accomplish this, them is provided an elongated generally semi-cylindrical sleeve body and an elongated generally semi-cylindrical sleeve cover, as well as a connector ring for facilitating assembly of the sleeve body and cover to one another and mounting the sleeve to a vessel. The connector ring includes an internally threaded recess at one end for threaded engagement with male threads on an end of the sleeve body. The opposite end of the connector ring has female threads for connection with a threaded nipple on the vessel. At the end of the sleeve body remote from the connector ring, a circumferentially projecting lug or stop projects in a circumferential direction from each of the opposite side edges of the sleeve body for engagement with an inset end of the sleeve cover. This prevents axial movement of the cover in one axial direction relative to the sleeve body when assembled. Adjacent the same end of the sleeve remote from the connector ring, a pair of quick connect/disconnect latches are provided. These latches are cooperable between the cover and sleeve body to readily and quickly connect and disconnect the cover and body relative to one another. The latches comprise over-center latches which are spring-biased in a latched position. Each of the side edges of the cover also has a groove for receiving a sealing gasket, preferably a silicone chord of circular cross-section. The gasket is preferably adhesively secured in the groove. A rim also projects circumferentially and along an outer side of the groove serving as a protective barrier for the gasket.

To secure the cover and sleeve body to one another, one end of the sleeve is inserted into the recess on the end of the connector ring and the edges of the semi-cylindrical sleeve body and cover are brought into engagement one with the other. This locates the inset portions of the cover at its opposite end in axial opposition to and engagement with the stops. The latch parts, i.e., the latch spring and keeper, are then secured one to the other, biasing the cover and sleeve body toward one another whereby the silicone chord gasket forms an effective seal between the cover and body. Additionally, to further improve the seal, a plurality of spring-biased pins are located through the connector ring and bias the cover against the sleeve body. An additional feature of the present invention resides in the provision of cable tie mounts carried by the sleeve externally of the sleeve body. The cable tie mounts can be used in conjunction with ties to secure cabling to the external portions of the protective sleeve for muting the cabling from the protective sleeve to monitor a remote instrument.

In a preferred embodiment according to the present invention, there is provided a protective sleeve for an instrument gland comprising an elongated, generally semi-cylindrical sleeve body and an elongated generally semi-cylindrical sleeve cover, the sleeve body having an end tubular portion, a connector ring having a tubular portion at one end for engagement with the end tubular portion of the sleeve body and means carried by the connector ring and the end tubular portion of the sleeve body for securing the connector ring and the sleeve body to one another. One end of the cover is telescopically receivable within the connector ring when the cover is applied to the sleeve body with diametrical opposed longitudinal edges of the cover and the sleeve body engageable with one another to form a generally tubular protective sleeve. Quick connect and disconnect latches are carried by the sleeve and are cooperable between the cover and the sleeve body adjacent an opposite end of the sleeve for releasably coupling the cover and sleeve body to one another.

In a further preferred embodiment according to the present invention, there is provided a protective sleeve for an instrument gland comprising an elongated, generally semi-cylindrical sleeve body and an elongated generally semi-cylindrical sleeve cover, the sleeve body having an end tubular portion, and a connector ring having a tubular portion at one end for engagement with the end tubular portion of the sleeve body. Means are carried by the connector ring and the end tubular portion of the sleeve body for securing the connector ring and the sleeve body to one another. Quick connect and disconnect latches are carried by the sleeve and are cooperable between the cover and the sleeve body adjacent an opposite end of the sleeve for releasably coupling the cover and sleeve body to one another, and a sealing gasket is provided along registering longitudinal edges of the cover and the sleeve body for sealing the cover and sleeve body to one another when coupled to one another.

Accordingly, it is a primary object of the present invention to provide a novel and improved protective sleeve for protecting electrical cabling and portions of instruments depending from a closed vessel which forms an effective seal, reduces installation time for replacing the cover with a new seal and provides external mounts for securing cabling to the sleeve.

BEST MODE FOR CARRYING OUT THE INVENTION

Figure 1:
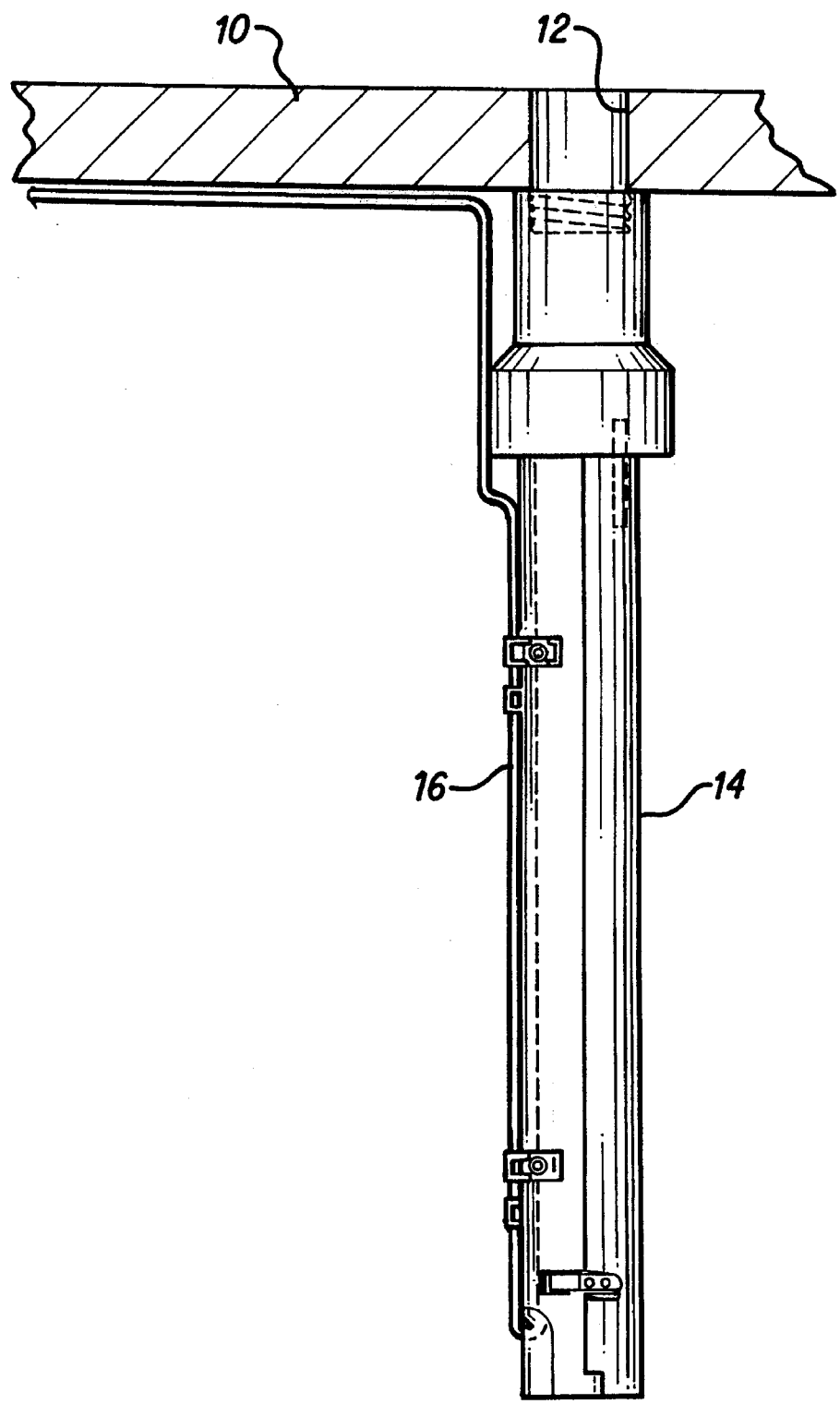
FIG. 1 is a schematic view of a protective sleeve applied to a vessel and illustrating electrical cabling extending through the sleeve.
Figure 2:
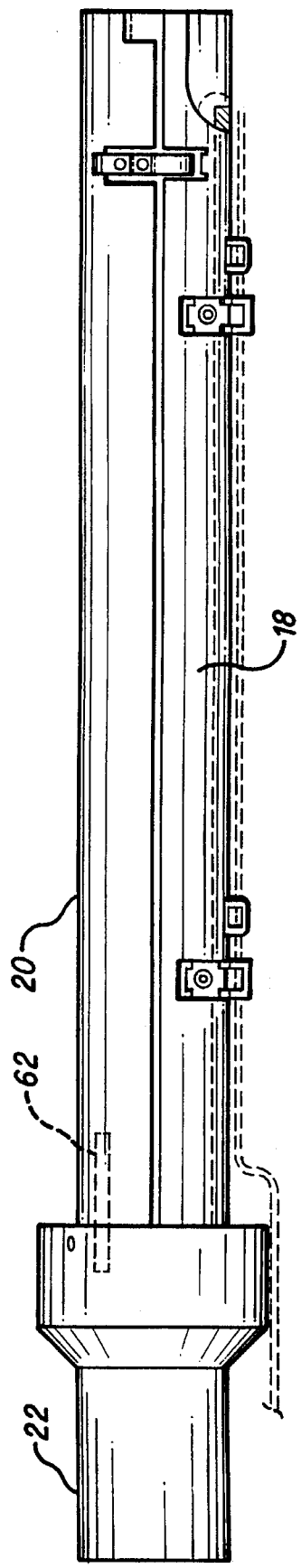
FIG. 2 is an enlarged elevational view of a protective sleeve according to the present invention.
Figure 3:
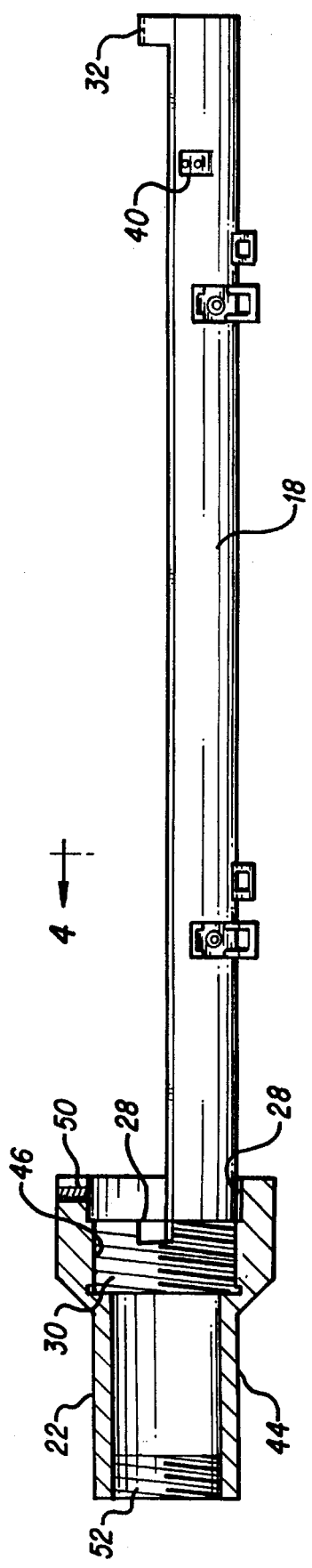
FIG. 3 is a side elevational view of a sleeve body illustrated secured to a connector ring illustrated in cross-section.
Figure 5:
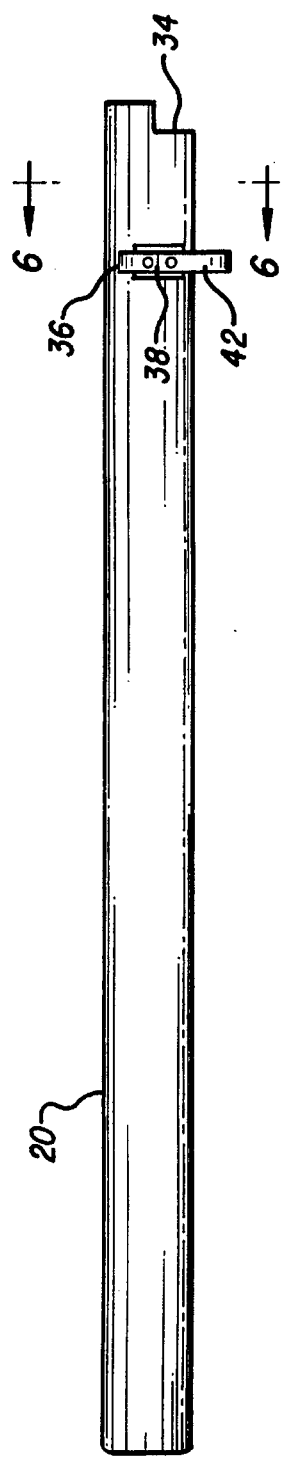
FIG. 5 is a side elevational view of a cover forming part of the sleeve hereof.
Figure 4:
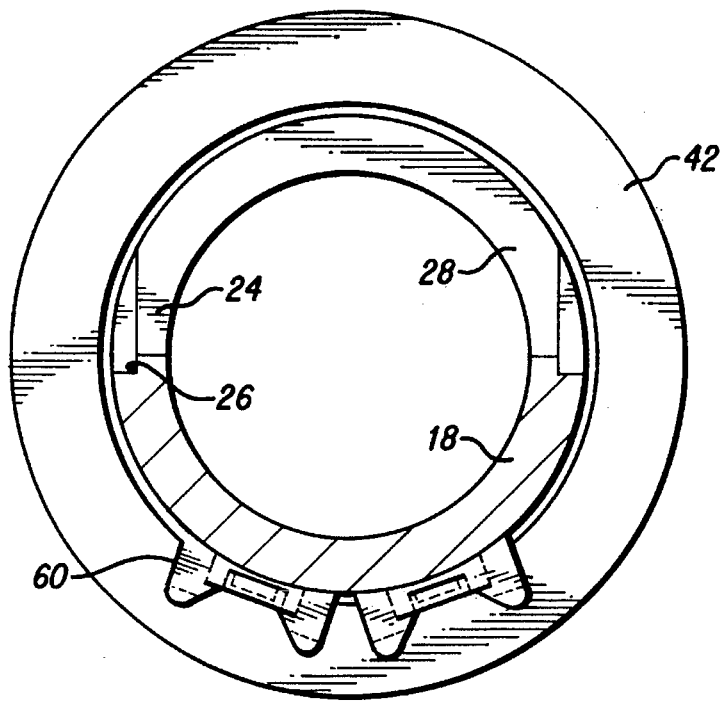
FIG. 4 is an enlarged cross-sectional view thereof taken generally about on line 4—4 in FIG. 3.
Figure 6:
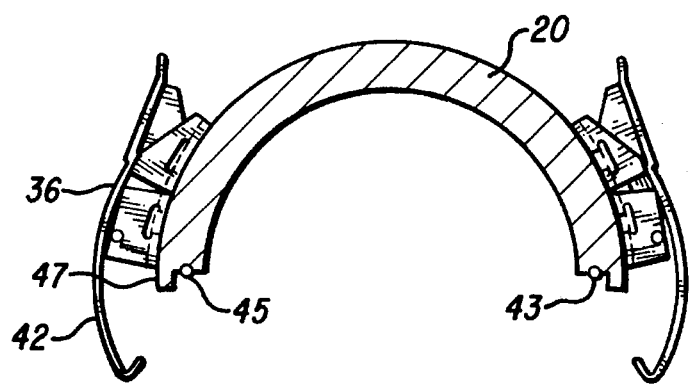
FIG. 6 is an enlarged cross-sectional view of the cover taken generally about on line 6—6 in FIG. 5.
Figure 7:
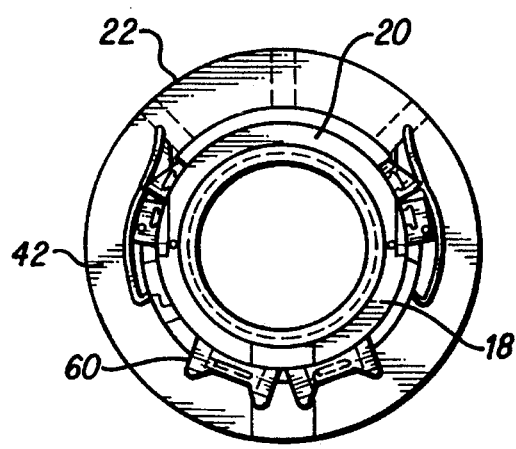
FIG. 7 is an end elevational view of the sleeve hereof on a reduced scale as viewed from right to left in FIG. 2.

Referring now to the drawings, particularly to FIG. 1, there is illustrated a portion of a closed vessel 10 having a port 12 through which part of an instrument, not shown, within the vessel projects externally of the vessel along its underside. A protective sleeve 14, according to the present invention, is threadedly engaged to a nipple carried by the vessel and depends from the undersurface of the vessel. The protective sleeve 14 surrounds a portion of the instrument and cabling 16 extending from the instrument. Referring now to FIGS. 2, 3 and 5, the sleeve 14 comprises a sleeve body 18, a cover 20 and an end connector ring 22. From a review of FIGS. 3 and 4, the sleeve body 18 comprises an elongated, generally semi-cylindrical tube or sleeve having diametrically opposed edges 24 and a groove 26 formed along the outermost portion of the edges 24. The end of sleeve body 18 adjacent connector ring 22 has a shortened, generally cylindrical section 28 which has male or external threads 30. The opposite end of sleeve body 18 is provided with a pair of stops or bosses 32 forming circumferential extensions from the opposite edges.

The cover 20 comprises an elongated generally semi-cylindrical section generally coextensive in length with the body sleeve 18, with the exception of the externally threaded portion 30 of sleeve body 18. The side edges of the cover at one end thereof are inset at 34 in a mariner complementary to the stops 32 on the sleeve body 18.

A pair of latch and keeper assemblies are provided on sleeve 14, particularly on the cover and sleeve body, respectively. The latches 36 include a latch operator 38 and a keeper 40. The latches are conventional over-center draw latches with a lever or operator-actuated latching spring arm 42. Consequently, when the latching spring arm 42 engages the keeper 40 and the lever 38 is moved to an over-center locking position, the latch maintains the sleeve and cover engaged with one another along their opposed registered side edges. To unlatch the cover and sleeve, the lever 38 is movable to an over-center position to extend the latch spring 42 whereby the latch is unlocked.

The cover 20 also includes a groove 43 formed along each of its diametrically opposite elongated edges for receiving a gasket 45. The gasket 45 is preferably adhesively secured to the cover along the groove 43. The outer edges of the cover 20 adjacent grooves 43 have circumferential projections 47 which are complementary in shape to the inset portions 26 of the sleeve body 18. Thus, when the cover and sleeve body are latched to one another, gasket 45 in groove 43 engages against and seals along the opposed edges 24 of the sleeve body and the projections 47 afford a protective barrier for the gasket.

The connector ring 22 comprises a shortened tube 44 having an enlarged diameter recess 46 at one end which is internally threaded for threaded connection with the threaded cylindrical portion 28 of the sleeve body 18. The recess is stepped to provide a slightly enlarged further recess 48 opening through the end of the connector ring 22. A plurality of spring-biased plungers 50 are circumferentially spaced one from the other about the connector ring 22 and project into the recess 48, for reasons described hereafter. The opposite end of connector ring 22 is internally threaded at 52.

A plurality of cable tie mounts 60 are secured on the sleeve body 18 at longitudinally spaced positions along its external surface. These cable tie mounts are slotted to receive ties, not shown, to secure cabling to the external surface of the protective sleeve 14 when installed below vessel 10.

To assemble the protective sleeve 14 hereof, the sleeve body 18 is screw-threaded into the recessed end of the connector ring 22, leaving the upper portion of the recess 48 of the connector ring 22 open. Cover 20 is then applied to the sleeve body 18 and connector ring 22 by first inserting one end of cover 18 into the recess 48. Upon insertion, the longitudinal edges of the cover 20 engage the corresponding longitudinal edges of the sleeve body 18. That is, the edge projections 47 engage in the inset portions 26 of the sleeve body 18, while the gasket 45 engages the surfaces 24 of those edges to seal the cover and sleeve body to one another. The projections 47 serve as an external barrier for protecting the seal 45. By engaging the seal of the cover against the edges of the sleeve body 18, the inset ends 34 engage the projections or bosses 32 and prevent axial movement of the cover relative to the sleeve body 18 and connector ring 22. By locating the cover between the bosses 32 and the tubular threaded portion 28 of the sleeve body 18, the latch operators are also aligned with the keepers. By locating the springs 42 of the latches on the keepers and rotating the levers over-center, the cover is locked to the body 18. It will also be appreciated that the spring-biased plungers 50 engage the cover within the recess 48 to urge the cover into continued sealing engagement along the edges of the sleeve body 18.

In use, the protective sleeve 14 is screw-threaded to the undersurface of the vessel 10 by threads 52. Portions of the instrument and cabling extend along the interior of sleeve 14, exiting the lower end as illustrated in FIG. 1. The cabling can then be muted along the external sides of the sleeve and secured to the tie mounts 60 by appropriate ties, not shown. Should it be necessary to route the cables through the sleeve, appropriate slots, for example, a slot indicated in FIG. 2 by the dashed lines 62, may be formed in the cover 20 and the cabling routed through that slot.

It will thus be appreciated that the objectives of the present invention are fully accomplished in the afore-described protector sleeve. Particularly, it can be readily seen that the installation time is greatly reduced in comparison with the installation time necessary to replace the sleeve cover previously described. For example, the present design does not employ hardware separate and apart from the sleeve itself, such as screws, washers and the like, which could be lost during servicing. Nor does the present design require any tools in order to replace the cover. The latches are simply moved to over-center positions, unlatching the cover, which can then be canted and withdrawn from the recess 48. A new cover can be instantly installed by telescoping an end of the new cover within recess 48, engaging the edge of the cover against the sleeve body 18, and operating the two latches to secure the cover to the sleeve body. A silicone chord employed as the gasket adhesively secured to the cover is not only in the shape of an O-ring as opposed to the prior rectangular sealing gasket but is recessed in the groove. This minimizes physical damage to the sealing gasket. If damage should occur to the seal, a replacement sleeve cover is installed in a minimum amount of time, usually less than one minute. Furthermore, the latching system of this invention does not permit the sleeve cover to fall off, even with the latches unclamped. The tongue-and-groove construction prevents axial displacement of the cover relative to the sleeve body when the sleeve depends from underneath a vessel. Also, the present invention is formed of aluminum and stainless steel and will therefore not rust. Seismic loadings are also reduced because of this lightweight construction.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A protective sleeve for an instrument gland comprising:

an elongated, generally semi-cylindrical sleeve body and an elongated generally semi-cylindrical sleeve cover;

said sleeve body having an end tubular portion;

a connector ring having a tubular portion at one end for engagement with the end tubular portion of said sleeve body;

means carried by said connector ring and said end tubular portion of said sleeve body for securing said connector ring and said sleeve body to one another;

one end of said cover being telescopically receivable within said connector ring when said cover is applied to said sleeve body with diametrical opposed longitudinal edges of said cover and said sleeve body engageable with one another to form a generally tubular protective sleeve;

a sealing gasket about the longitudinal edges of said cover and said sleeve body for sealing the cover and sleeve body to one another when secured to one another;

an element carried by said tubular portion of said connector ring for engaging said one end of said cover and biasing said cover into sealing engagement with said sleeve body; and quick connect and disconnect latches carried by said sleeve and cooperable between said cover and said sleeve body adjacent an opposite end of said sleeve for releasably coupling the cover and sleeve body to one another, whereby removal of said cover and access within said sleeve body are obtained with access only to said adjacent end of said sleeve by disconnecting said latches and substantially axially withdrawing without rotation said one cover end from said connector ring.

2. A sleeve according to claim 1 wherein the tubular portion of said connector ring has internal threads for threaded engagement with external threads on said end tubular portion of said sleeve body.

3. A sleeve according to claim 2 wherein said tubular portion of said connector ring includes an annular recess axially outwardly of said internal threads thereof for telescopically receiving said one cover end.

4. A sleeve according to claim 1 including a stop carried by said sleeve body and an abutment carried by said cover for engaging said stop to preclude axial movement of said cover in a direction away from said connector ring when said cover and said sleeve body are secured to one another.

5. A sleeve according to claim 1 wherein the tubular portion of said connector ring has internal threads for threaded engagement with external threads on said end tubular portion of said sleeve body, said tubular portion of said connector ring including an annular recess axially outwardly of said internal threads thereof for telescopically receiving said one cover end, said element including at least one spring biased plunger for urging said cover into sealing engagement with said sleeve body.

6. A sleeve according to claim 1 including at least one cable tie mount carried externally on one of said sleeve and said cover to secure a cable to the sleeve.

7. A sleeve according to claim 1 wherein the tubular portion of said connector ring has internal threads for threaded engagement with external threads on said end tubular portion of said sleeve body, said tubular portion of said connector ring including an annular recess axially outwardly of said internal threads thereof for telescopically receiving said one cover end and including a stop carried by said sleeve body and an abutment carried by said cover for engaging said stop to preclude axial movement of said cover in a direction away from said connector ring when said cover and said sleeve body are secured to one another.

8. A sleeve according to claim 1 wherein said sealing gasket has a circular cross-sectional configuration, a groove formed along longitudinally extending side edges of one of said cover and said sleeve body for receiving said gasket, an elongated, generally circumferentially extending projection formed along the longitudinally extending side edges of said one cover and said sleeve body and outwardly thereof whereby said projection serves as a barrier for protecting the gasket.

* * * * *